United States Patent [19]
Carter

[11] 4,336,573
[45] Jun. 22, 1982

[54] ILLUMINATED SKATE

[76] Inventor: Leonard C. Carter, 1335 Willis St., Redding, Calif. 96001

[21] Appl. No.: 169,442

[22] Filed: Jul. 16, 1980

[51] Int. Cl.³ .............................................. B60Q 1/00
[52] U.S. Cl. ...................................... 362/78; 362/61; 362/103; 362/191; 362/806
[58] Field of Search ................... 362/78, 61, 103, 191, 362/806

[56] References Cited

U.S. PATENT DOCUMENTS

| | | | |
|---|---|---|---|
| 2,140,224 | 12/1938 | Galgoczy | 362/103 |
| 2,502,566 | 4/1950 | Hooley | 362/103 |
| 2,531,959 | 11/1950 | Woodard et al. | 362/103 |

Primary Examiner—Stephen J. Lechert, Jr.
Attorney, Agent, or Firm—Blair, Brown & Kreten

[57] ABSTRACT

Disclosed herein is an illuminated skate such as a skateboard, a roller skate or the like including a person carrying platform under which is provided a pair of axles supported from the platform upon which in rolling engagement is provided wheels thereon. Further, a source of power is disposed on the bottom surface of the person carrying platform which is operatively connected to a light source in such a manner that the underside of the skate is illuminated, and in particular, the wheels being formed of translucent material are capable of transmitting the light generated by the source along outer faces thereof.

7 Claims, 9 Drawing Figures

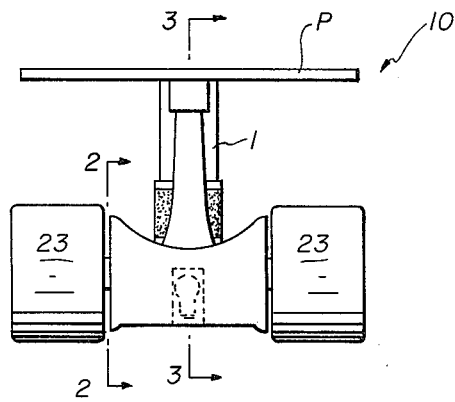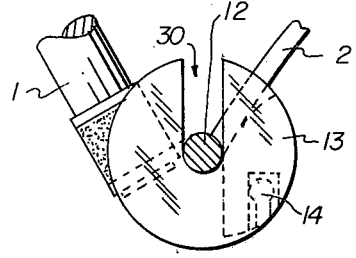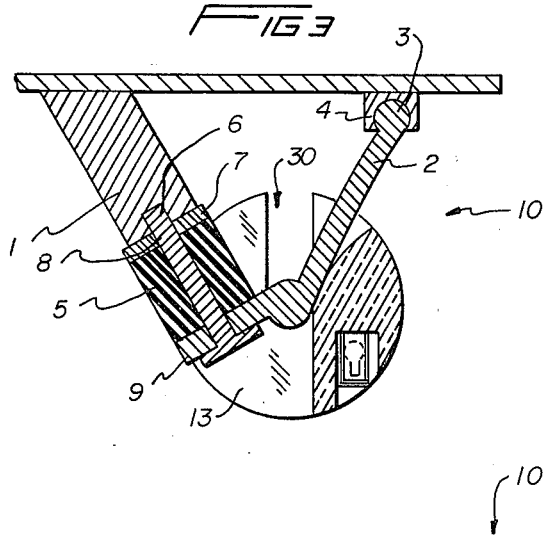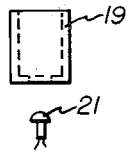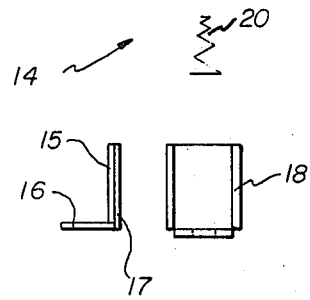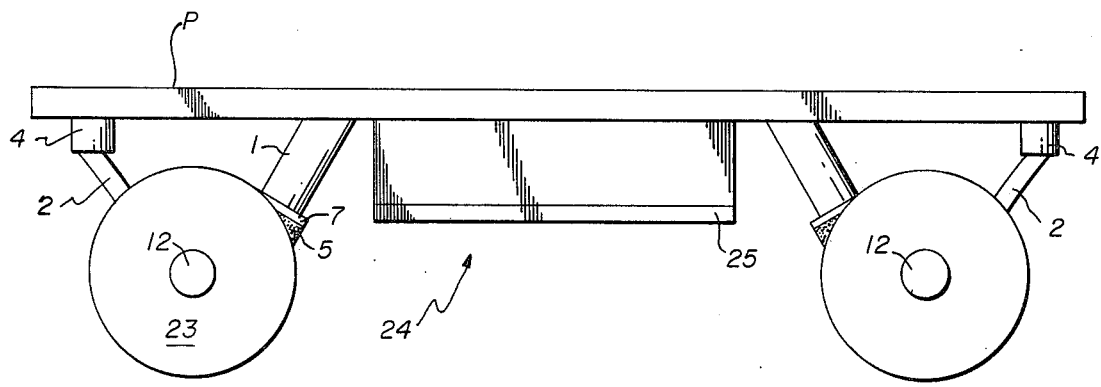

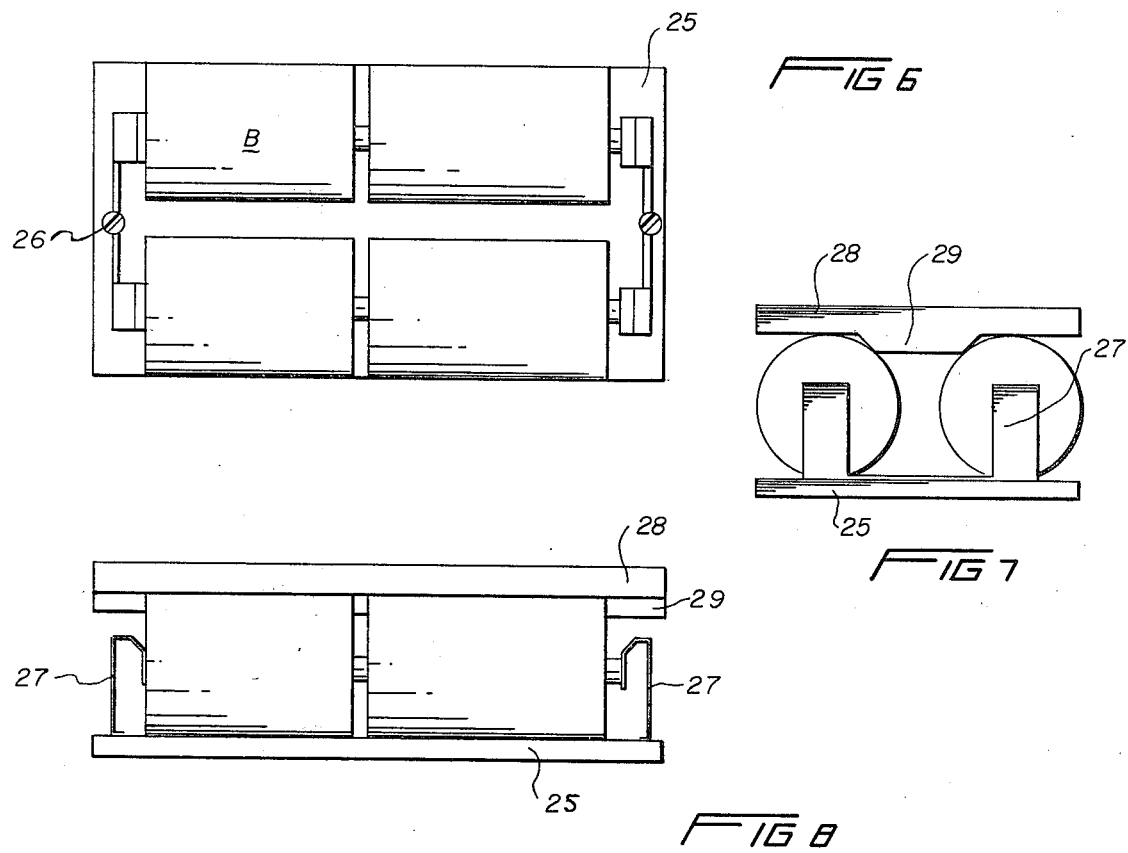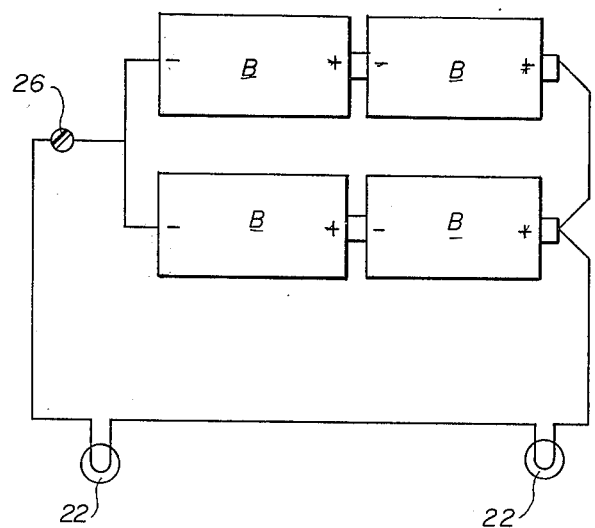

ILLUMINATED SKATE

BACKGROUND OF THE INVENTION

The use of skateboards, roller skates, and the like have gained increasing popularity recently due to the beneficial exercise and social ambience associated therewith.

Also associated therewith have been an increase in the number of injuries not only due to the inexperience of many riders, but also because it has become fashionable to use these devices after dark when visibility is poor.

The following patents reflect the state of the art of which applicant is aware and those similarities which those patents coincidentially share with the instant application will be discussed in greater detail hereinafter.

| 2,424,783 | Ware | 3,046,032 | Humphries |
| 3,152,812 | Cummings | 3,302,954 | Elwell |

While all of these patents relate to skates and the like having various wheel support mechanisms, none of the references teach the use of an illumination device on the bottom face of the person carrying platform, nor do they provide for or render obvious the inclusion of a light transmitting member for directing illumination to the wheels themselves.

By way of contrast, the instant application is directed to and specifies a skate mechanism having a person carrying platform from which depends axle support mechanisms, upon which, wheels are provided, a light source for transmitting illumination below the platform and along the wheels thereof powered by a suitable source of energy.

OBJECTS AND SUMMARY OF THE INVENTION

Accordingly, it is an object of this invention to provide a device which can provide the beneficial illumination so as to reduce the risk of not being visible after dark.

Further, it is an object of the present invention to provide a device of the character described above which is aesthetically pleasing when viewed from a distance and can provide plural different colors for their exotic appearances.

It is still a further object of this invention to provide a device of the character described above which is relatively inexpensive to manufacture, simple to use, durable in construction, and capable of being installed on a plurality of different types of skates, skateboards, or the like.

It is yet a further object of this invention to provide a device of the character described above which has a relatively long life span, and can be easily actuated.

It is yet a further object of this invention to provide a device of the character described above in which the actual components providing the illumination are not readily disearnable, provide no impediment to the mobility of the person using the device, and will not adversley effect the maneuverability of the skate.

These and other objects are provided in the invention according to the present application by disposing a source of electrical power on a bottom surface of a person carrying platform, a pair of axles supported on the bottom face thereof and light transmitting wheels on extremities of the axles capable of displaying the light transmitted by a light source powered by a battery.

These and other objects will be made manifest when considering the following detailed specification when taken in conjunction with the appended drawing figures.

BRIEF DESCRIPTION OF THE DRAWINGS

FIG. 1 is an end view of the illuminated skate according to the present invention.

FIG. 2 is a sectional view taken along lines 2—2 of FIG. 1.

FIG. 3 is a sectional view taken along lines 3—3 of FIG. 1.

FIG. 4 is an exploded parts diagram of the illumination source.

FIG. 5 is a side view of the skate showing the battery pack.

FIG. 6 is a plan view of the interior portion of the battery pack.

FIG. 7 is a side view of that which is shown in FIG. 6 having the end sidewall removed.

FIG. 8 is another side view of that which is shown in FIG. 6 with the wall similarly removed.

FIG. 9 is a schematic of the battery source and the light bulb and switch according to the present invention.

BRIEF DESCRIPTION OF THE PREFERRED EMBODIMENT

Referring now to the drawings, wherein like reference numerals refer to like parts throughout the various drawing figures, reference numeral 10 is directed to the illuminated skate according to the present invention.

This skate 10 may generally be regarded as having a person carrying platform P from which depends wheel support means defined by a first bar 2, a second bar 1, depending from said platform P and angulated to intersect, and terminate remote from the platform. The axle 12 extends normal to the plane defined by the first and second bars at the intersection thereof, and the two bars are interconnected by means of a flange 9 extending outwardly from the first bar. FIG. 3 shows a preferred form for the second bar in which a damping means 5 is provided between the flange and a stem portion of the second bar 1, in which the flange is connected to the stem portion by means of a bolt 6 threadly (8) engaging a bore having complimental threads 7. A terminal portion of the first bar 2 proximate to the platform is joined thereat by means of a ball 3 inserted within a socket 4.

A shroud 13 is provided concentric around and parallel to the axle 12 as best seen in FIG. 1 and the shroud has an opening or upwardly extending slot 30 the sidewalls of which frictionally or spring resiliently engage the axle 12. The shroud 13 is provided therewithin, a means for illumination 14 which in a preferred form comprises a bulb 22, a housing 19 for the bulb, a contact pin 21 adapted to communicate with a contact area on the bulb, a spring disposed therebelow to assure contact with the bulb, and an overlying chamber 18 for isolating the bulb from the environment. An L shaped mounting bracket having a leg 16 and a doubled wall vertical leg 15, 17 is provided to affix the chamber 18 within the shroud 13. Preferably, the shroud is formed from a light transmitting material such as fiber optics, lucite, or the like, and the shroud communicates closely with the wheels 23 as shall now be explained.

The wheels 23 are supported on the axle 12, and the side faces thereof are provided with light transmitting and/or reflective substance similar to lucite to provide the desired illumination effect. The lights are powered by a battery disposed within a case 24 carried on a bottom face of the skate in a manner now to be described.

The schematic in FIG. 9 depicts two sets of batteries B connected in parallel, wherein each set is formed from two batteries connected in series. Also connected in series with the array of batteries are plural lights or bulbs 22 capable of being energized when switch 26 has been operatively engaged.

Specifically, the battery pack has a top wall 28 mounted to the bottom face of the platform P and includes a longitudinal medially disposed downwardly extending rib means 29 which separates the sets of batteries and assures that displacement of the batteries is not possible. For simplicity, the sidewalls shown in FIG. 5 are not duplicated in FIGS. 6, 7 and 8, but the intent is to make the battery pack immune from external contamination by the environment such as through dust, corrosives, moisture, and the like. A bottom wall of the battery case 25 is provided with upwardly extending contact springs 27 as shown in the drawings to frictionally retain the plural batteries within the compartment and in good electrical contact so as to provide a reliable source of power for the lights.

Having thus described the invention, it should be apparent that there has been provided a roller skating device in which a source of illumination is disposed below the person supporting platform of the skate, roller skate, skateboard, or the like, so as to provide illumination below the platform itself. In a preferred form, the illumination means takes the form of a shroud frictionally engaging the axle, the shroud being of light transmitting material, so as to carry the light to wheels which also transmit the light, and may also have reflective portions for increasing the aesthetic appearance and intensifying the illumination. It should be clear therefore that a higher degree of visibility has been provided for skaters for playing at night, and that numerous structural modifications are contemplated as being a part of this invention as set forth hereinabove and as specified hereinbelow by the claims.

I claim:

1. An illuminated skate such as a skateboard, roller skates, or the like having a person carrying platform, comprising in combination:

wheel support means depending from the platform and carrying wheels thereon including, first and second bars depending from the platform and angulated to intersect and terminate remote from the platform, an axle eminating from the intersection thereof transverse to a plane formed by said bars, said axle carrying said wheels, battery means carried on and below the platform and illumination means operatively connected to said battery means below the platform whereby when energized, said illumination means illuminates an area below the platform, wherein said illumination means comprises an elongate shroud having an upwardly extending slot therein, walls of said slot frictionally engaging said axle, and light means in said shroud, and said shroud is light transmitting.

2. The device of claim 1 wherein said wheels are light transmitting whereby said illumination means passes light therethrough.

3. The device of claim 2 wherein said light means comprises a bulb and a container therefor, a contact pin engaging one contact on said bulb extending through said container, said container serving as a second contact for said bulb, a spring disposed below said contact, a chamber for encapsulating said bulb, contact, spring and container in overlying relationship, and a bracket for fastening said chamber to said shroud.

4. The device of claim 3 wherein said battery means includes a casing having a top surface connected to the platform, a bottom surface having battery retention clips, and side walls depending from said top surface, said battery placed between said clips, a circuit breaker extending from said battery means to said light means, and rib means depending from said top surface to help support said battery means.

5. The device of claim 4 wherein there are two sets of batteries pairs, said pairs connected in series, said sets in parallel and said rib means extends between each said set.

6. The device of claim 5 wherein there are two wheel support means, said first bar held to the platform by a ball and socket, and having a flange remote from the platform.

7. The device of claim 6 wherein said second bar is connected to said flange and has a damping means thereat comprising a cylindrical resilient member as a portion of said second bar through which a threaded bolt passes from said flange to a threaded stem portion of said second bar.

* * * * *